United States Patent
Hemmann et al.

(10) Patent No.: US 10,343,942 B2
(45) Date of Patent: Jul. 9, 2019

(54) METHOD FOR CONTROLLING A COOLING PROCESS, PRODUCTION METHOD AND OPEN-LOOP AND CLOSED-LOOP CONTROL DEVICE AS WELL AS PRODUCTION APPARATUS FOR GLASS BODIES

(71) Applicant: SOFTWARE & TECHNOLOGIE GLAS GMBH (STG), Cottbus-Kiekebusch (DE)

(72) Inventors: Norwid Hemmann, Cottbus (DE); Peter Hemmann, Cottbus (DE); Thomas Schulz, Döbern (DE); Matthias Schützel, Lauchhammer (DE)

(73) Assignee: Software & Technologie Glas GmbH (STG), Cottbus-Kiekebusch (DE)

( * ) Notice: Subject to any disclaimer, the term of this patent is extended or adjusted under 35 U.S.C. 154(b) by 154 days.

(21) Appl. No.: 15/507,196

(22) PCT Filed: Aug. 27, 2015

(86) PCT No.: PCT/EP2015/069695
§ 371 (c)(1),
(2) Date: Jun. 23, 2017

(87) PCT Pub. No.: WO2016/030484
PCT Pub. Date: Mar. 3, 2016

(65) Prior Publication Data
US 2017/0313615 A1 Nov. 2, 2017

(30) Foreign Application Priority Data
Aug. 27, 2014 (DE) .......................... 10 2014 217 045

(51) Int. Cl.
*C03B 9/38* (2006.01)

(52) U.S. Cl.
CPC .......... *C03B 9/3816* (2013.01); *C03B 9/3808* (2013.01)

(58) Field of Classification Search
USPC ...................... 65/29.1, 29.11, 29.19
See application file for complete search history.

(56) References Cited

U.S. PATENT DOCUMENTS 3,615,330 A * 10/1971 Jones ...................... C03B 11/12
   65/161
3,630,707 A * 12/1971 Ayers ...................... C03B 11/12
   65/162

(Continued)

FOREIGN PATENT DOCUMENTS

DE   19728425 C1   6/1998
DE   19756313 A1   6/1998

(Continued)

*Primary Examiner* — Cynthia Szewczyk
(74) *Attorney, Agent, or Firm* — Seed Intellectual Property Law Group LLP

(57) ABSTRACT

A method for controlling a process of cooling a number of glass molds with a cooling medium in a process of producing glass bodies, wherein a production section of the section machine is respectively assigned at least one of the glass molds, and, for cooling the number of glass molds, the cooling medium is supplied on a jointly shared basis, wherein the supplying of the shared cooling medium for the number of glass molds is jointly controlled and the shared cooling medium is assigned a number of absolute cooling medium parameters and the absolute cooling medium parameters are determined as cooling medium parameters that are shared by the number of glass molds. It is provided that the cooling medium is assigned as absolute cooling medium parameters that can be set jointly for the number of glass molds at least one cooling capability, in particular a cooling output, and a cooling pressure, which are set, in particular are subjected to closed-loop and/or open-loop (Continued)

control, wherein, on the basis of a desired cooling capability, in particular desired cooling output, of the cooling medium, a cooling capability variable is determined by means of a primary actuating device, and the cooling capability variable is prescribed to a secondary actuating device, and, depending on the prescribed cooling capability variable, a cooling pressure variable is prescribed by means of the secondary actuating device on the basis of the cooling pressure of the cooling medium in such a way that a cooling capability, in particular a cooling output, of the cooling medium is made to approximate to the desired cooling capability, in particular a cooling output, of the cooling medium.

26 Claims, 8 Drawing Sheets

(56) References Cited

U.S. PATENT DOCUMENTS

| | | | |
|---|---|---|---|
| 3,953,188 | A | 4/1976 | Fertik |
| 4,654,066 | A * | 3/1987 | Garcia .................. C03B 9/3808 65/162 |
| 5,548,633 | A | 8/1996 | Kujawa et al. |
| 2012/0261850 | A1 * | 10/2012 | Simon .................. B29C 49/4823 264/40.6 |

FOREIGN PATENT DOCUMENTS

| | | |
|---|---|---|
| DE | 102004054254 B4 | 5/2007 |
| EP | 1136453 A1 | 9/2001 |
| GB | 1273579 | 5/1972 |
| GB | 2011128 A | 7/1979 |
| GB | 2182924 A | 5/1987 |

* cited by examiner

METHOD FOR CONTROLLING A COOLING PROCESS, PRODUCTION METHOD AND OPEN-LOOP AND CLOSED-LOOP CONTROL DEVICE AS WELL AS PRODUCTION APPARATUS FOR GLASS BODIES

BACKGROUND

Technical Field

The invention relates to a method for controlling a process of cooling a number of glass molds in a process of producing glass bodies, in particular hollow glass bodies, in a section machine with a further number of production sections, wherein a production section of the section machine is respectively assigned at least one glass mold, in particular wherein a cooling gas, in particular a cooling air, is used as the cooling medium and/or the section machine is an individual section machine (IS machine) or a rotary section machine (rotary blowing machine), and for cooling the number of glass molds a cooling medium shared by the number of glass molds is supplied to the glass molds, wherein the cooling for the number of glass molds is jointly controlled and the cooling medium is assigned a number of absolute cooling medium parameters and the absolute cooling medium parameters are determined as cooling medium parameters that are shared by the number of glass molds.

Description of the Related Art

For the automated machine production of glass bodies, in a section machine known per se with a number of production sections a hot gob of liquid glass is respectively introduced into a glass mold of a production section. A production section of the section machine is respectively assigned at least one glass mold. Thus, there are section machines with one glass mold per section but also section machines with two or even four glass molds per section, for example a double-gob 10-station IS machine. The glass mold is cooled to reduce overheating of the same, especially with a cooling medium in the form of cooling air, cooling vapor or other cooling gases or cooling fluids, such as for example possibly also water. Since the cooling of the glass mold also has an influence on the glass body produced as a result of the temperature control of the glass mold, appropriate cooling is required, but this is usually performed in an uncontrolled manner.

If cooling is carried out within a closed-loop or open-loop control process, customary measures that are to be preferred are based on the idea that all of the production sections of the section machine can be supplied with a cooling medium stream of cooling medium that is made available for all of the production sections on a jointly shared basis and adapted accordingly, i.e., is subjected to open-loop or closed-loop control. As in GB 1 273 579, such measures envisage for example the measuring of a glass mold temperature and the corresponding adaptation of a volume or a mass of a cooling medium of the cooling medium stream. A measurement of the temperature of the glass mold may be performed for example by way of a temperature sensor or else by way of the thermal radiation, as in U.S. Pat. No. 5,548,633. It has been found that such approaches for supplying all of the production sections with a cooling medium stream that is shared by all of the glass molds of the production sections, is subjected to closed-loop and/or open-loop control and is thereby set, can be problematic on account of the individual conditions at each individual production section.

Thus, measures as in DE 197 56 313 A1 propose creating a single average measured variable for controlling the cooling output jointly for all of the production sections. Such a measure has been found to be advantageous in principle, since it can direct the control primarily at the cooling output. This allows reliable control to be made available, while the control of a cooling output for all of the stations jointly can represent a comparatively good control method with comparatively little effort. However, the approach of a control module provided there is still found to leave room for improvement, since it is provided for changing the cut-off frequency on the basis of the type-specific internal mold surface temperature.

This temperature is determined by way of an optical sensor each time the mold is opened, in order when there are deviations from a prescribed type-specific value to change the amount of cooling air such that the setpoint value is reached again. The internal surface temperature of the blank mold or finish mold is measured by an optical temperature sensor with a measuring range of 8 to 14 μm and the humidity content of the cooling medium is measured and, by means of a computer, the cut-off frequency responsible for the effective cooling output is controlled and the internal mold surface temperature is controlled by way of the amount, temperature and air humidity of the cooling medium.

Again very much more complex measures in EP 1 136 453 A1 provide for each production section a separate cooling apparatus, which is capable of individually setting the volume flow or mass flow of the cooling air or the pressure conditions of the cooling air at each individual production section; in that case by an individual fan provided for each production section and a cooler for the cooling air.

Other complex measures, as described in DE 10 2004 054 254 B4, provide that an automatic influencing of the cooling output takes place by electrical, hydraulic or pneumatic actuating elements for each station or each mold, once again separately. Essential to this prior-art method is that the internal mold temperatures of the individual stations or molds are acquired cyclically, preferably by a contactless temperature sensor, which for measuring the individual temperatures is moved by means of an automatic positioning device. By a comparison between the controlled variables thus produced and the reference variables and separate formation of the manipulated variables, the internal mold temperature of each station is automatically controlled and adapted to the target specifications of the setpoint values. An optimization may additionally take place, merely to save energy, in that the overall cooling output produced is reduced by an adaptation under closed-loop or open-loop control to the overall cooling output actually needed, for example by changing the rotational speed of the fan V by way of a frequency converter, changing the preliminary pressure or by connecting an upstream swirl controller.

It is found that the compromise between expenditure on apparatus and expenditure on control for the cooling of a first number of glass molds, while maintaining quality standards for the glass bodies produced, is in many cases at the expense of the complexity and costs of the cooling systems. Other comparable simple solutions do provide the possibility of setting the cooling for all of the production sections of the section machine jointly. These however wrongly depend on the throughput of the cooling medium, such as a cooling air mass flow or volume flow; such as for example in DE 197 28 425 C1 in dependence on a glass mold temperature. This has the consequence that irregularities at a production section—such as for example the unavoidable interruption in the cooling air when changing a production section or when removing a glass mold or other interventions in the production machine that may well occur frequently—are wrongly corrected and thus have an influence on the production of a glass body in the other glass molds, without there being any necessity for this.

It is desirable to make a comparatively simple and robust, but nevertheless reliable cooling of the glass molds available for a section machine. In particular, a cooling-output-based control for all of the stations jointly that is devised in DE 197 56 313 A1 is to be improved.

BRIEF SUMMARY

Provided is a method, a production process, and a control device. Preferably, the method and the device are intended to make available a control that is in any event in principle shared by all of the production sections of the section machine, i.e., in particular taking into account a number of absolute cooling medium parameters, for cooling the number of glass molds. It is intended to focus primarily on the control of the cooling capability, but possibly also on the control of individual cooling medium parameters singly or in combination, for all of the stations jointly. In particular, it is intended to focus preferably on the control of the cooling output and/or cooling capacity and/or singly or in combination on the control of a cooling medium temperature and/or cooling medium humidity. To this extent, for controlling a cooling capability, the control of a cooling output and/or a cooling temperature and/or a cooling medium humidity may be provided in particular. However, this is not intended to rule out the possibility that additional control measures or individual measures may nevertheless be possible individually for each production section.

Provided is a method for controlling a process of cooling a number of glass molds in a process of producing glass bodies, in particular hollow glass bodies, in a section machine with a further number of production sections, wherein a production section of the section machine is respectively assigned a glass mold.

The glass bodies are preferably hollow glass bodies. A cooling gas, in particular a cooling air or cooling vapor, or some other cooling fluid such as a water vapor, may be used as the cooling medium, or a gaseous cooling medium saturated with water vapor; in principle, for the variation of a cooling capacity of the cooling medium, a composition of the same may be varied. Thus, in principle, a water cooling or other liquid cooling may nevertheless also be provided.

The aforementioned explanations can be advantageously applied generally to any type of section machine with a number of production sections. The section machine is preferably an individual section machine (IS machine) or a rotary section machine (rotary blowing machine). Both types of a section machine are known in the basic setup to a person skilled in the art—in one case with production sections next to one another, in the other case on a carousel. Incidentally, application of the concept of the invention is not restricted to the preferred section machines mentioned.

For cooling the number of glass molds, the number of glass molds are supplied with the cooling medium on a jointly shared basis, wherein the supplying of the shared cooling medium for the number of glass molds is jointly controlled and the shared cooling medium is assigned a number of absolute cooling medium parameters and the absolute cooling medium parameters are determined as cooling medium parameters that are shared by the number of glass molds.

It is provided that the cooling medium is assigned as absolute cooling medium parameters that can be set jointly for the number of glass molds at least one cooling capability and a cooling pressure, which are set, in particular are subjected to closed-loop and/or open-loop control, wherein on the basis of a desired cooling capability of the cooling medium, a cooling capability variable is determined by means of a primary actuating device, and the cooling capability variable is prescribed to a secondary actuating device, and depending on the prescribed cooling capability variable, a cooling pressure variable is prescribed by means of the secondary actuating device on the basis of the cooling pressure of the cooling medium in such a way that a cooling capability of the cooling medium is made to approximate to the desired cooling capability of the cooling medium.

A cooling capability according to the concept of the invention is taken in principle to mean the capability of the cooling medium to absorb and dissipate heat.

Further developments of the invention can be taken from the subclaims and provide in detail advantageous possible ways of realizing the explained concept in the course of achieving the object and with regard to further advantages.

The cooling capability is preferably a cooling output and/or a cooling capacity or a variable describing a cooling output and/or a cooling capacity. Preferably, the cooling medium is assigned as absolute cooling medium parameters that can be set jointly for the number of glass molds at least one cooling output and a cooling pressure, which are set, in particular are subjected to closed-loop and/or open-loop control, wherein on the basis of a desired cooling output of the cooling medium, a cooling output variable is determined by means of a primary actuating device, and the cooling output variable is prescribed to a secondary actuating device, and depending on the prescribed cooling output variable, a cooling pressure variable is prescribed by means of the secondary actuating device on the basis of the cooling pressure of the cooling medium in such a way that a cooling output of the cooling medium is made to approximate to the desired cooling output of the cooling medium.

For example, the cooling capability can be improved by a controlled cooling output. In particular, a variable describing the cooling capability may be a defined cooling output taking into account a mass and/or volume flow of the cooling medium, a temperature of the cooling medium and a cooling medium humidity. Preferably, a defined cooling output is proportional to the product of the mass and/or volume flow of the cooling medium, the temperature of the cooling medium and the cooling medium humidity, in particular relative cooling medium humidity, and the cooling capacity.

Preferably, the cooling capability variable, in particular the cooling output variable, comprises one or more of the variables that are selected from the group consisting of:

the cooling output of the cooling medium, in particular the absolute cooling output of the cooling medium, which is supplied to a second number of production sections of the section machine on a jointly shared basis.

Preferably, the cooling capability therefore concerns a cooling output. In particular, the cooling capability may however also—if need be even only—be obtained by increasing a cooling medium parameter such as for example a temperature of the cooling medium or a cooling medium humidity; to this extent in particular by such cooling medium parameters that influence the cooling output directly and dominate the ambience. In a variant, the cooling capability concerns in addition or as an alternative to the cooling output such cooling medium parameters that influence the cooling output directly; in particular, in a simplified variant, the cooling capability can do without the determination of the cooling output and take place only with cooling medium parameters that are, situation-dependently, included in the cooling output decisively, that is to say dominate in the ambience. Accordingly, a cooling capability or a variable describing the cooling capability may additionally or alternatively be a temperature of the cooling medium and/or a cooling medium humidity, optionally taking into account a mass and/or volume flow of the cooling medium.

In principle, the cooling capability may also concern a mentioned cooling capacity alone or in combination. Preferably, a variable describing the cooling capacity may be a composition of the cooling medium, in particular a vapor fraction. In particular, a cooling capacity may be additionally or alternatively used for matching, for example be given by the selection or matching of the composition of a cooling medium, such as for example of gas, vapor, air, water or the like. Preferably, the cooling capacity of the cooling medium is an absolute cooling capacity of the cooling medium that is supplied to a second number of production sections of the section machine on a jointly shared basis.

Variants of an embodiment that are preferred in this respect are explained with reference to FIG. 3.

Preferably, the primary actuating device comprises an open-loop and/or closed-loop control device by means of which the cooling capability, in particular a cooling output, is controlled in a closed-loop and/or open-loop manner in dependence on a glass mold temperature. In principle, the primary actuating device and/or the secondary actuating device may be formed as an open-loop control device or closed-loop control device or a combination of an open-loop control device and a closed-loop control device, for example as part of a combination of a pre-control and a closed-loop control device respectively for the primary actuating device and the secondary actuating device. It is also possible for example for the primary actuating device to be realized as part of an open-loop control device and for the secondary actuating device to be formed as part of a closed-loop control device.

Advantageously, the primary actuating device comprises an open-loop and/or closed-loop control device by means of which the cooling output is controlled in a closed-loop and/or open-loop manner in dependence on a glass mold temperature, in particular as part of a pre-control with downstream closed-loop control of the cooling output; in particular, the cooling output is controlled constantly with a value that can be variably prescribed but is fixed.

In the meantime, preferred methods of temperature measurement in the case of a glass mold have proven to be possible, for example by way of an IR sensor, so that a corresponding control loop can be advantageously made available for prescribing a cooling output in dependence on a glass mold temperature. And yet the cooling output can nevertheless also be controlled for example in dependence on a glass mold temperature, for example as part of a pre-control with downstream control of the cooling output and/or control of a cooling pressure variable. Depending on the ambient conditions, it may also prove to be advantageous that for certain time periods the cooling output is kept constant with a value that can be variably prescribed but is fixed for this time period, as part of a corresponding open-loop control.

Advantageously, the secondary actuating device comprises an open-loop and/or closed-loop control device by means of which the cooling pressure variable is controlled in a closed-loop and/or open-loop manner in dependence on the prescribed cooling output, in particular as part of a pre-control with downstream closed-loop control of the cooling pressure variable; in particular, the secondary actuating device comprises a measured value acquisition for at least the cooling pressure variable. These and other possibilities for realizing an actuating device may arise depending on the specification for the plant or the technical functionality of a specific section machine.

For example, for controlling the cooling pressure variable in a closed-loop and/or open-loop manner, an open-loop and/or closed-loop control device of the secondary actuating device may comprise for example:

a frequency converter, which controls the speed of a motor of a cooling air fan or a coolant pump; or a control flap in the coolant stream, for example a control flap referred to as a "swirl controller"; or a combination of the two. In the case of a combination, the position of the control flap may be chosen such that the frequency converter can control in an open-loop manner in an optimum working range. Or the output of the frequency converter may be chosen such that the control flap can control in a closed-loop manner in an optimum working range.

Preferably, the cooling medium is assigned absolute free or other cooling medium parameters that can be determined jointly for the number of glass molds, which are determined and preprocessed by means of a filter for filtering at least one of the free cooling medium parameters. Preferably, the cooling medium is therefore also assigned other shared absolute cooling medium parameters for the number of glass molds, which are determined by means of a filter for filtering at least one of the shared absolute cooling medium parameters. In particular, the primary actuating device comprises: an acquisition, in particular measured value acquisition, and a filter, for the at least one cooling medium parameter, in particular free cooling medium parameter.

A free cooling medium parameter should be understood in particular as meaning such a parameter that is not set, in particular is only measured. Preferably, the primary actuating device has a measured value acquisition for at least one or more of the cooling medium parameters that are selected from the group: the cooling medium temperature, cooling medium humidity, in particular relative cooling medium humidity, mass and/or volume flow of the cooling medium. In addition or as an alternative, the cooling medium parameters may be measured on the cooling medium and/or a measured value may be filtered in a filter.

Within a further particularly preferred development, the prescribed cooling output variable is determined by means of a filter for filtering at least one free cooling medium parameter. The filter is advantageously realized as part of the primary actuating device. Advantageously, a measured value acquisition for the cooling pressure variable is realized as part of the secondary actuating device, in particular as a necessary component part of a corresponding closed-loop control device for the cooling pressure variable. In addition, measured value acquisitions for the free cooling medium parameters, in particular the temperature of the cooling air, the humidity of the cooling air and a mass and/or volume flow of the cooling air, may be realized in the primary actuating device.

Advantageously, the primary actuating device comprises the filter and a measured value acquisition for at least one, in particular free, cooling medium parameter; preferably a mass and/or volume flow of the cooling medium and/or the cooling output and/or a cooling pressure. This development has found that many of the problems in the case of glass production machines with a centrally controlled cooling medium supply arise as a result of changes in the section machine being performed for certain production sections and these changes incorrectly having effects on other production sections as a result of the control of a cooling medium jointly for all of the production sections.

The development has found that it is conducive to simplified plant maintenance and also conducive to an assured quality of the hollow glass bodies if such interventions in the glass production machine, referred to as external disturbances, do not find their way into the correction process. The concept of the invention within this development is based in particular on the idea that it is more conducive to handling of the production apparatus and to product quality to direct the control on the basis of a primary actuating device and secondary actuating device to setting the cooling output and the cooling pressure variable—in particular to balancing the humidity and temperature of the ambience or other ambient parameters—, while external disturbances are filtered out from suitable cooling medium parameters, preferably from a mass and/or volume flow of the cooling medium and/or the cooling output and/or a cooling pressure.

In principle, specifying a filter for filtering, preferably at least one free cooling medium parameter such as the mass and/or volume flow of the cooling medium, may provide in particular an intelligent filter that detects external disturbances. Within the development, external disturbances are characterized in particular by a comparatively brief occurrence. Detection parameters of the filter preferably comprise one or more of the features selected from the group: the gradient acquisition of a variation over time of a free cooling medium parameter, the extreme value acquisition of a variation over time of a free cooling medium parameter, the temporal limitedness of a variation over time of a free cooling medium parameter, in particular temporal limitedness to less than 10 minutes, preferably less than 5 minutes, in particular less than 1 to 2 minutes. In principle, such an intelligent filter may be designed for the self-detection of external disturbances even by other measures. In particular, an intelligent filter may be supported by corresponding signaling, which indicates an external disturbance in the production apparatus.

While a filter can in principle also be used for the settable cooling medium parameters or other cooling medium parameters, it nevertheless proves to be particularly advantageous for a free cooling medium parameter, i.e., a cooling medium parameter that cannot be set. Although it makes sense, with some reservations, also to filter the settable cooling medium parameters, this could nevertheless adversely influence the control dynamics. On the other hand, external disturbances can be detected particularly well from free cooling medium parameters, such as a mass and/or volume flow of the cooling medium. In principle, this would also possibly be detectable on the basis of a drop in a cooling pressure variable or a rise in the cooling output.

A particularly preferred filter—whether for filtering especially the direct effects in the mass and/or volume flow or for other free cooling medium parameters or whether for filtering a cooling pressure variable or cooling output variable—may for example be configured as a running average. The intelligence of such a filter may for example be derived from two or more running averages being provided, the drift of which is compared with one another. In particular, a first running average may be determined on a comparatively short time scale—for example of perhaps 1 to 2 measured values one after the other—and a second running average may be determined on a comparatively long time scale—for example a running average of perhaps measured values that are acquired over a time period of 1 to 2 minutes. The intelligence of this filter is then derived from the two running averages—to be specific for example the short-time running average and the long-time running average—being compared. Should there be within a drift a deviation above a threshold value between the first average and the second average, an external disturbance in the section machine or in a production section or a glass mold is detected.

Preferably, in that case the filter may provide that not the running average, for example for the mass flow or volume flow, is used for the control but instead the average over the long time scale or some other average, or indeed simply the threshold value, at least however not the current measured values. This procedure may be followed until the deviation of the two averages from one another lies below a threshold value again. An example of such an effect of averaging is explained with reference to FIG. 4 and FIG. 5.

It has been found that the present development can be realized comparatively easily in relation to a filter and is helpful for solving the most predominant problems occurring when there is central control of a cooling medium shared by all of the production sections. The development has found that most of the problems mentioned at the beginning in the operation of a section machine can be solved in fact by a simple control taking into account the aforementioned filters. In addition, the development has also found that the control of the cooling medium that is to this extent a central control, i.e., shared by all of the production sections, with use of the cooling medium parameter that is referred to here as the absolute cooling medium parameter, avoids an unnecessary complexity of the overall system. Rather, it has been found that solutions which are provided with comparatively great expenditure on individual controls of a production section may to this extent be contrary to the actual interest, since this may impair the stability of the overall system or the stability of the entire control system. The concept of the invention consequently not only has the advantage of a certain simplicity and robustness, but additionally also considerable advantages in the quality assurance of the glass bodies produced.

Preferably, the primary actuating device for the cooling output and the secondary actuating device for the cooling pressure are cascaded. In particular, the primary actuating device comprises an outer open-loop control and/or an outer control loop, which is subordinate to the secondary actuating device as an inner open-loop control and/or an inner control loop. In addition or as an alternative, the primary actuating device and the secondary actuating device may be coupled by way of the measured value acquisition for at least one, in particular free, cooling medium parameter. Within a particularly preferred development, a following control scheme has proven to be robust, simple and quality-assuring. Advantageously, a primary actuating device for the cooling output and a secondary actuating device for the cooling pressure are arranged in a cascading manner, wherein the primary actuating device comprises an outer open-loop control or an outer control loop, in which the secondary actuating device is subordinate as an inner open-loop control or an inner control loop. A cascaded actuating device, in particular as a combination of an outer pre-control and an inner closed-loop control, makes it possible—in a comparatively simple way for the inner control loop—to prescribe suitably stable range limits for values within which a very robust and quick correction is possible, in this case of the cooling pressure variable.

Preferably, on the basis of the desired cooling capability, in particular desired cooling output, as a SETPOINT value of the cooling medium, a cooling capability variable, in particular cooling output variable, is determined as an ACTUAL value by means of the primary actuating device in the form of an outer control loop and the cooling capability variable, in particular cooling output variable, is prescribed as a reference variable to a secondary actuating device in the form of an inner control loop and, depending on the prescribed cooling capability variable, in particular cooling output variable, as the reference variable, a cooling pressure variable is prescribed as a SETPOINT value by means of the secondary actuating device on the basis of the cooling pressure as the ACTUAL value of the cooling medium in such a way that a cooling capability variable, in particular cooling output variable, as an ACTUAL value of the cooling medium is made to approximate to the desired cooling capability variable, in particular cooling output variable, as a SETPOINT value of the cooling medium.

Building on this, it has proven to be advantageous that, on the basis of the desired cooling output as a SETPOINT value of the cooling medium, a cooling output variable is determined as an ACTUAL value by means of the primary actuating device in the form of an outer control loop and a cooling output variable is prescribed as a reference variable to a secondary actuating device in the form of an inner control loop. In particular, depending on the prescribed cooling output variable as the reference variable, a cooling pressure variable is prescribed as a SETPOINT value by means of the secondary actuating device on the basis of the cooling pressure as the ACTUAL value of the cooling medium in such a way that a cooling output variable as the ACTUAL value of the cooling medium is made to approximate to the desired cooling output variable as a SETPOINT value of the cooling medium.

In addition or as an alternative, the desired cooling output may be prescribed as a SETPOINT value to a primary actuating device and the ACTUAL value may be determined as a cooling output variable and a deviation of the SETPOINT value and ACTUAL value used as a prescribed cooling output variable, to be specific as a reference variable, and, depending on the prescribed cooling output variable as a reference variable, the cooling pressure variable set by means of the secondary actuating device in such a way that the deviation is reduced.

Advantageously, the production sections are supplied with a cooling medium to which a number of determinable cooling medium parameters are assigned, to be specific—in the sense of a control of a cooling medium shared by all of the production sections—before the cooling medium is divided among the production sections. In addition or as an alternative, for cooling the number of glass molds, in particular all of the glass molds or production sections, a cooling medium is supplied to the number of glass molds, and the settable cooling medium parameters are jointly controlled as absolute cooling medium parameters (that is to say for a cooling medium that can be supplied to all of the production sections on a jointly shared basis) for a further number of production sections of the section machine, in particular all of the production sections. In particular, it is additionally or alternatively provided that the settable cooling medium parameters of a cooling medium are no longer controlled individually for a single production section of the second number. Rather, it is left to the plant operator within the concept of the aforementioned development to set the individual production sections individually and manually to sensitivities of the section machine or to provide a certain automatism in the setting of throttle valves or similar actuating elements. The aforementioned control concept according to the invention may also relate to a control of a cooling medium shared by all of the production sections, i.e., to absolute cooling medium parameters, i.e., before the cooling medium is divided among the production sections.

Within the scope of this application, the term pressure variable comprises in particular one or more variables that sufficiently describe a pressure of the cooling medium. In particular, these are selected from the group consisting of: the pressure of the cooling medium, in particular the flow pressure of a cooling medium stream of the cooling medium, in particular the static or dynamic pressure of the cooling medium, in particular the flow pressure of a cooling medium stream of the cooling medium that is supplied to a second number of production sections of the section machine on a jointly shared basis. For example, a pressure of the cooling medium, in particular a flow pressure of a cooling medium stream of the cooling medium, may be determined, preferably measured, simulated or calculated.

Within the scope of this application, the cooling output variable comprises in particular one or more of the variables that are capable of describing a cooling output and/or a cooling capacity of the cooling medium. In particular, these are selected from the group consisting of: the cooling capacity of the cooling medium, the cooling output of the cooling medium, in particular the absolute cooling capacity and/or the cooling output of the cooling medium, which is supplied to a second number of production sections of the section machine on a jointly shared basis.

In particular, within a preferred development, the cooling capacity or cooling output of the cooling medium is prescribed as a defined cooling output or cooling capacity, to be specific as a product of the mass and/or volume flow of the cooling medium, the temperature of the cooling medium and the cooling medium humidity, in particular the relative cooling medium humidity. In principle, a cooling output variable, such as a cooling output or cooling capacity, may also be determined with additional cooling medium parameters, for example taking into account gas or liquid properties of the cooling medium, or other properties that impair or change the cooling capability of the cooling medium. This may also include, for example, the chemical composition of the cooling medium or an electromagnetic charging of the cooling medium or other forms in which the properties of the cooling medium change.

The aforementioned free cooling medium parameters comprise at least and not only the following variables: the mass and/or volume flow of the cooling medium, the temperature of the cooling medium and the cooling medium humidity, in particular the relative cooling medium humidity. In addition or as an alternative, the free cooling medium parameters may be measured on the cooling medium and/or be filtered in a filter as a measured value.

As explained above, the filter may be designed to determine an irregularity of the cooling output variable or one of the variables influencing the latter. In particular, external disturbances may occur in a section machine, in particular a production section of the section machine. In addition or as an alternative, the filter may be designed to eliminate the irregularities in the cooling output variable for the prescribed cooling output variable. In principle, the filter is designed to compensate for such irregularities in a free cooling medium parameter.

A development provides in particular that a determined value of a mass and/or volume flow of the cooling medium is initially fed to a first value filter and only the filtered value is used for determining a defined cooling output or cooling capacity, in particular a defined and absolute cooling output or cooling capacity. Preferably, the first value filter is activated for the case where an intervention in a production section that influences a value of a mass and/or volume flow of the cooling medium is signaled or analyzed. Advantageously, the temperature of the cooling medium and the cooling medium humidity may also initially be fed to a second value filter and only the filtered value used for determining a defined cooling output or cooling capacity, in particular a defined and absolute cooling output or cooling capacity. Preferably, the second value filter is activated for the case where an intervention in a production section that influences a value of a defined cooling output or cooling capacity, in particular a defined and absolute cooling output or cooling capacity, of the cooling medium is signaled, analyzed or detected.

Within a particularly preferred development, the first and/or second value filter and/or a filter for some other measured value or free cooling medium parameter is designed as comprising one or more filter units. The filter units are preferably selected from the group consisting of: smoothing, a time-based high-frequency filter, running averaging, replacing values exceeding a threshold value with a substitute value, in particular a threshold value or a preferably running average, replacing excessive values and/or extreme values. Suitable in particular are intelligent filters that are combined with a detection analysis or signaling unit for the detection of an external intervention, and consequently an accompanying external controlling variable.

Within a particularly preferred variant as a development of a filter, it may alternatively or additionally be provided that the filter monitors a relationship between the coolant pressure and coolant flow rate that is calculated on the basis of a model and/or is acquired in advance from empirical statistics, and a deviation from this functional relationship beyond a tolerance band that can be prescribed has the effect that a filter starts. The filter may preferably provide that either the measured value of the coolant flow rate is replaced from time to time by the long-time average of the same until the deviation has ended, or it may for example be provided that the automatic correction of the setpoint value for the coolant pressure is suspended for this time.

This or another kind of filter could for example concern the detection of a cross-sectional change in the stream of coolant through the machine that is brought about for example by the machine operator. Such a cross-sectional change may have been brought about by switching off one or more sections or by manual changes in the machine setting. The latter possibly requires a resetting of the setpoint value of the master control circuit for the cooling capacity. Such a setpoint value adaptation within the filter may be performed manually by the plant operator, or be performed independently by the control.

An open-loop control and/or closed-loop control with said filter that is particularly advantageous according to the development may comprise a signal output, which makes the plant operator aware of the change. In addition or as an alternative, the advantageous open-loop control and/or closed-loop control with said filter may comprise a value output, which suggests a new setpoint value to the plant operator. This can for example be confirmed or be replaced by an input by the operator.

Such monitoring and filtering as part of the open-loop control and/or closed-loop control would also be advantageous to the extent that a cross-sectional change of the stream of coolant through the machine that is deliberately brought about by the plant operator (for example opening or closing for the readjustment of a selected individual section) is specifically not to be compensated by changing the preliminary coolant pressure, but instead the control is intended to continue independently at the level thus changed of the overall cooling.

In the normal case, a plant operator may only activate the preferred master control circuit concerning the cooling capacity when he has completed the setting of the sections. However, the aforementioned variant as a development also takes exceptional cases into account, and to this extent this is a correspondingly intelligent open-loop control and/or closed-loop control that guarantees high-quality plant operation even for exceptional cases.

However, within a further particularly preferred variant as a development, instead of an aforementioned filter in the classic sense for a suitable cooling medium parameter—especially for the mass and/or volume flow—, there is also the possibility of allowing this cooling medium parameter of the mass and/or volume flow (flow rate of the coolant) especially to be disregarded completely. Alternatively, an open-loop control and/or closed-loop control that works with a coolant stream to be calculated internally on the basis of a model as a function of the coolant pressure may be provided for this. Then a kind of model filter is preferably provided, a filter which provides a modeling of the mass and/or volume flow, wherein the variation of the volume and/or mass flow of the cooling air is modeled as a function of the coolant pressure of the cooling air. This corresponds to the assumption of a fixed flow resistance in the section machine. The aforementioned classic filtering especially of this mass and/or volume flow (flow rate of the coolant) could then be omitted.

Embodiments of the invention are now described below on the basis of the drawing in comparison with the prior art. The drawing is not necessarily intended to show the exemplary embodiments to scale, but rather takes a schematized and/or slightly distorted form wherever this is useful for explanatory purposes. For additions to the teachings that are directly evident from the drawing, reference is made to the relevant prior art. At the same time, it must be taken into account that a wide variety of modifications and changes relating to the form and detail of an embodiment can be made without departing from the general concept of the invention. This applies in particular, but not exclusively, to the following aspects.

Thus, as explained above, the concept of the invention provides that, on the basis of a desired cooling capability, in particular desired cooling output, of the cooling medium, a cooling capability variable is determined by means of a primary actuating device and the cooling capability variable is prescribed to a secondary actuating device, and, depending on the prescribed cooling capability variable, a cooling pressure variable is prescribed by means of the secondary actuating device on the basis of the cooling pressure of the cooling medium in such a way that a cooling capability, in particular a cooling output, of the cooling medium is made to approximate to the desired cooling capability, in particular a cooling output, of the cooling medium. In particular, the cooling capability comprises a variable describing a cooling output and/or a cooling capacity.

Thus, preferably a variable describing the cooling capability may be a defined cooling output taking into account a mass and/or volume flow of the cooling medium; preferably with a temperature of the cooling medium that is variable but prescribed as fixed and/or a humidity of the cooling medium that is variable but prescribed as fixed.

It is preferably intended that changes of the coolant input temperature or changes of the coolant humidity can be corrected by a changed amount of coolant, in order to keep constant the cooling capacity flow or such like cooling capability that is shared by all of the sections.

In addition or as an alternative to such a preferred change of the amount of coolant, the preferred maintenance of a prescribed, in particular constant, cooling capacity flow or similar cooling capability may be achieved as a target. In particular, this is also explained as an option as part of the embodiment of FIG. 3. A variable describing the cooling capability may be in particular a temperature of the cooling medium and/or a humidity of the cooling medium; this with a mass and/or volume flow of the cooling medium that is optionally variable but prescribed as fixed or taking into account a mass and/or volume flow of the cooling medium or in dependence on the latter.

For example, a specifically selected change of the coolant temperature and/or humidity may be provided for all of the aforementioned variants. This may take place for example by heating or cooling the coolant and/or by mixing it with a further medium of another, higher or lower temperature. This may additionally or alternatively also take place by a specifically selected change of a coolant humidity, for example by "humidifying" or drying the coolant and/or take place by mixing it with a further cooling medium of another, higher or lower humidity.

In particular, it has proven to be preferred to achieve the setting of a cooling capacity by means of an operation involving mixing one or more coolants. This can be implemented particularly advantageously from technical aspects of the plant. Preferably, this also comprises that a variable describing the cooling capacity concerns a composition of the cooling medium. In particular, a vapor fraction or an inert gas fraction or similar fractions of coolants of different chemical compositions and kinds of state may be varied.

The features of the invention that are disclosed in the description, in the drawing and in the claims may be essential to the development of the invention both individually and in any desired combination. Moreover, the scope of the invention covers all combinations of at least two of the features disclosed in the description, the drawing and/or the claims. The general concept of the invention is not limited to the exact form or the detail of the preferred embodiment shown and described below or limited to a subject matter that would be restricted in comparison with the subject matter in the claims. Where dimensional ranges are specified, values lying within the stated limits are also intended to be disclosed as limit values and able to be used and claimed as desired.

BRIEF DESCRIPTION OF THE SEVERAL VIEWS OF THE DRAWINGS

Further advantages, features and details of the invention emerge from the following description of preferred embodiments and on the basis of the drawing, in which.

DETAILED DESCRIPTION

Figure 1:
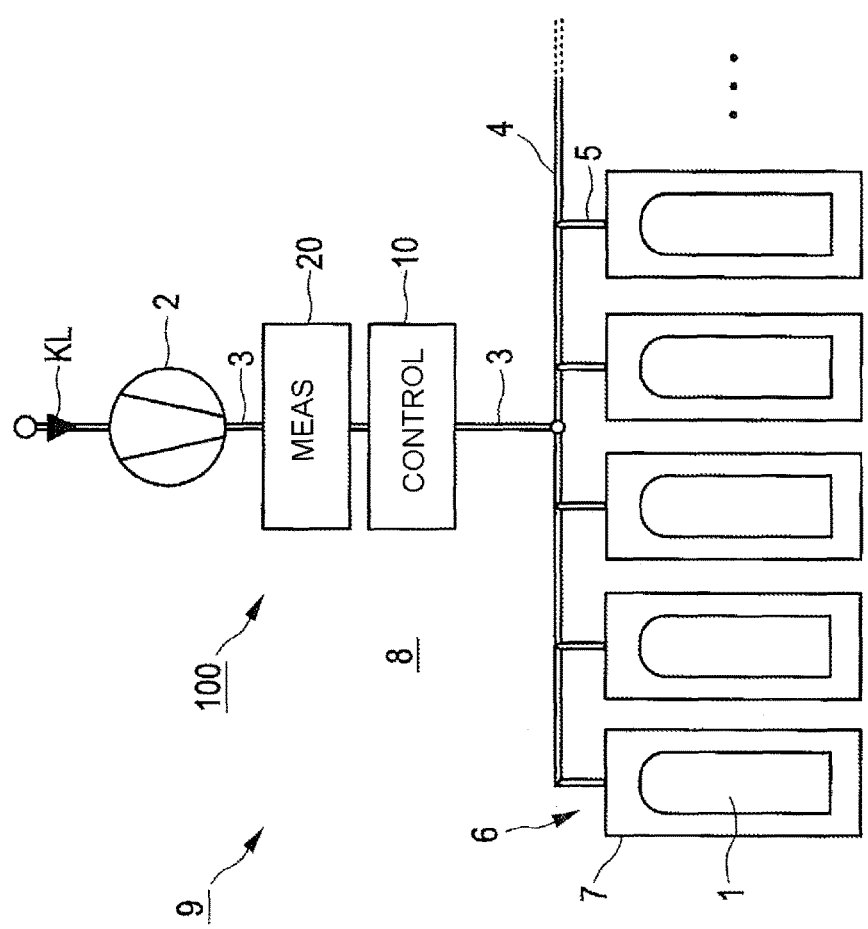
FIG. 1 shows a schematic representation of a production device in the form of a section machine, here an individual section machine, for producing glass bodies.

FIG. 1 schematically shows the basic setup of a production device 9 known per se for glass bodies 1, in this case for hollow glass bodies. Here, the production device 9 is a so-called section machine, here in the form of an individual section machine (IS), as is sufficiently well known in the field of glass body production. In principle, the section machine 9 may, however, also be formed for example as a rotary blowing machine. In the case of an individual section machine, individual production sections 6 are arranged in series, formed independently of one another with in each case a glass mold 7 for respectively producing a glass body 1.

The section machine 9 has for this purpose a central source 2 for cooling medium—here cooling air KL—, which may for example be formed as a blower or the like, and also a central cooling air ducting 3, which adjoins a gallery 4, both as parts of a shared cooling air ducting. Branching off from the gallery 4 are individual cooling air lines 5 to the production sections 6 which comprise the glass molds 7. In this way, cooling air KL can be set from the central source 2 initially within a cooling air ducting 3, 4 shared by all of the production sections 6. For this purpose, the section machine 9 has as part of the shared cooling air ducting 3, 4 a cooling process 8, a measuring and control device 100 and, assigned thereto, a control device 10 and a measuring device 20.

Figure 2:
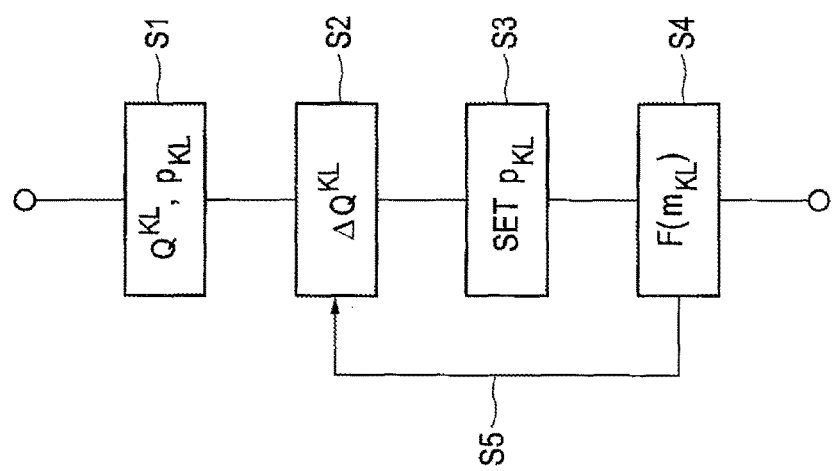
FIG. 2 shows a basic procedure by way of example of a control method for cooling the number of glass molds within a flow diagram according to the concept of the invention.
Figure 3:
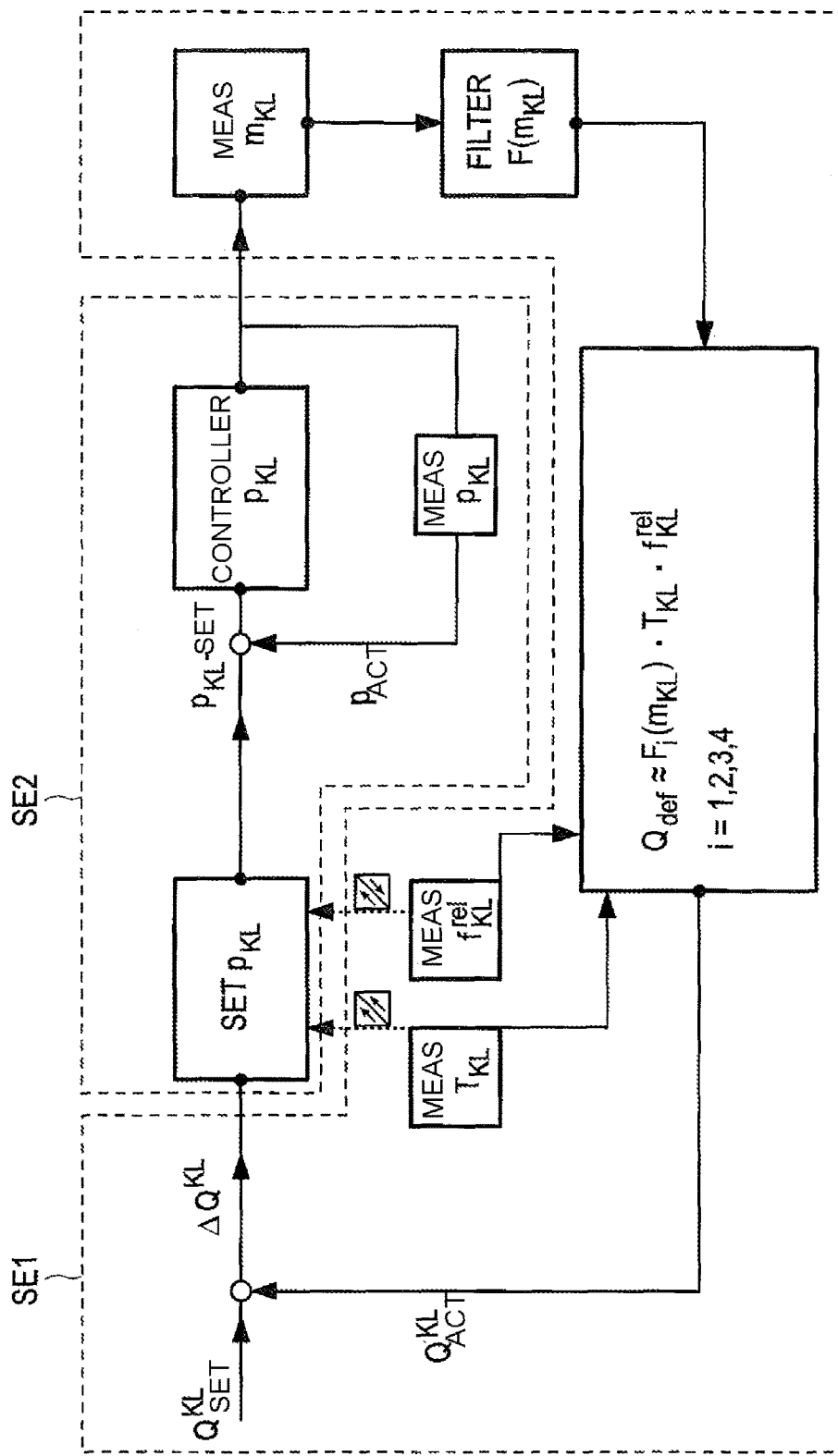
FIG. 3 shows a representation of a detail of a cascaded control scheme according to the concept of a method for controlling a cooling of a number of glass molds.

FIG. 2 shows method steps of a method for controlling the cooling process 8 of the section machine 9 that is explained in FIG. 3, to be specific for cooling a number of glass molds 7 for producing the glass bodies 1 in the section machine 9. In the following, reference is made to FIG. 1, FIG. 2 and FIG. 3 together.

In the method, in a first method step S1, a number of determinable cooling medium parameters are assigned to the cooling medium, here cooling air KL, that is conducted in the shared cooling air ducting 3, 4—that is to say before the cooling medium is divided among the production sections 7. In method step S1, for this purpose the settable cooling medium parameters of a cooling output Q-KL and a cooling pressure p-KL are shown; the cooling output Q-KL is used here as a control parameter, as a particularly preferred possibility of a cooling capability of the cooling medium. Apart from the settable cooling medium parameters, also serving for characterizing the cooling medium are the free cooling medium parameters, measurable here, of a temperature T-KL of the cooling air KL, a cooling medium humidity f-KL as a relative cooling medium humidity and a mass and/or volume flow m-KL of the cooling air KL—the latter three measured in a suitable measuring device MEAS denoted in FIG. 3. However, in a modification, the values of a temperature T-KL of the cooling air KL, of a cooling medium humidity f-KL as a relative cooling medium humidity and of a mass and/or volume flow m-KL of the cooling air KL may in principle also be obtained from some other source, for instance a simulation, an assumption or an external information source.

In the following case, instead of cooling medium the term "cooling air" is also used, since the production method described by way of example in the present case works with cooling air KL. Nevertheless, other cooling media, such as other cooling gases, are also possible; in principle, it is also possible to make a cooling medium available in the form of a vapor or a liquid; this for example to influence a cooling capacity by controlling a fraction of various cooling media.

In a second method step S2, on the basis of the cooling capability of the cooling medium—here the cooling output Q-KL of the cooling air KL—, a cooling output variable Q-KL-ACT is determined by means of a primary actuating device SE1, explained on the basis of FIG. 3, and is prescribed to a secondary actuating device SE2, explained more specifically in FIG. 3. In the present method step S2, according to FIG. 3, a difference ΔQ-KL is formed from an ACTUAL value Q-KL-ACT that is in any case approximately actual and a desired SETPOINT value Q-KL-SET of the cooling output and is made available to the secondary actuating device SE2 as a reference variable—to be specific here the difference ΔQ-KL.

In a third method step S3, then, depending on the prescribed cooling output variable—here the difference between the SETPOINT value and the ACTUAL value of the cooling output, i.e., ΔQ-KL—, a cooling pressure variable p-KL is prescribed by means of the secondary actuating device explained more precisely on the basis of FIG. 3. In method step S3 and in FIG. 3, for this purpose a setting unit SET-p-KL for a SETPOINT value of the cooling pressure variable p-KL-SET is shown.

FIG. 3 also shows at the location of the setting unit SET-p-KL additionally or alternatively available variants, which can be used to prescribe a cooling pressure variable p-KL depending on a generally prescribable cooling capability variable. In principle, a variable describing the cooling capability may be also, in particular only, a temperature T-KL of the cooling medium and/or, in particular only, a cooling medium humidity f-KL—optionally taking into account a mass and/or volume flow m-KL of the cooling medium. These control connections to the setting unit SET-p-KL for a SETPOINT value of the cooling pressure variable p-KL-SET are shown in FIG. 3 by dashed lines as additional or alternative possibilities of a control connection by difference ΔQ-KL.

As further explained on the basis of FIG. 3, the cooling pressure variable p-KL is further prescribed by a cascaded inner control loop of the secondary actuating device SE2. That is to say that here the cooling pressure variable is determined as an output value of a controller CONTROLLER-p-KL and on the basis of the ACTUAL value of a cooling pressure p-KL and in relation to said SETPOINT value p-KL-SET. On the basis of the reference variable ΔQ-KL, the determination is performed in such a way that a desired cooling output variable Q-KL-SET is established.

As explained more specifically on the basis of FIG. 3, for this purpose the primary actuating device SE1, formed as a control loop, and the secondary actuating device SE2, formed as a control loop, are coupled by way of corresponding measuring elements MEAS for the free cooling medium parameters temperature T-KL and air humidity f-KL. If the temperature T-KL of the cooling air KL rises, the pressure p-KL for the cooling air KL is also raised. If on the other hand, the air humidity f-KL of the cooling air KL rises, the pressure p-KL of the cooling air KL is lowered; these effects are shown by corresponding arrow symbols on the dashed control connections to the setting unit SET-p-KL. The background is that, with a rising temperature and increasing air humidity, the cooling capacity or the cooling output Q-KL of the amount of cooling air rises. In order therefore to adapt the cooling output Q-KL under varied temperature T-KL and air humidity f-KL of the cooling air KL, a pressure p-KL of the cooling air KL is correspondingly adjusted within an adjustment SET-p-KL.

This can be achieved in a preferred way already from the control connection by difference ΔQ-KL to the setting unit SET-p-KL. In a first preferred variant of the embodiment as it is shown in FIG. 3, the setpoint value p-KL-SET can only be obtained on the basis of the determination of a defined cooling output variable Q-def, as it is specified below. In such a particularly preferred first variant, variations of the temperature T-KL and air humidity f-KL of the cooling medium as indicated in FIG. 3 are included.

In principle, it may also be provided in an additional or alternative variant that the cooling medium parameters such as temperature T-KL of the cooling air KL and/or air humidity f-KL of the cooling air KL are taken into account individually or in combination in order to determine a setpoint value p-KL-SET; in particular, the second variant may be used as a very simplified embodiment, without the defined cooling output variable Q-KL-def mentioned below being determined; to be specific in particular taking into account only one or both of the control connections shown by dashed lines (without taking into account the control connection by difference ΔQ-KL).

In a third variant, it may be provided in particular that for example the mass and/or volume flow m-KL is used in combination with the temperature T-KL of the cooling air (for example as a product)—possibly without further account being taken of the air humidity f-KL—for determining a setpoint value p-KL-SET. In a fourth variant, it may be provided for example that only the mass and volume flow m-KL is used in a way shown in FIG. 3 as a product with only the air humidity f-KL—possibly without account being taken of the temperature T-KL of the cooling air KL—in order to determine a setpoint value p-KL-SET. The choice of the determination for SET-T-KL is indicated in FIG. 3 by the three control arrows for Q-KL-ACT, MEAS T-KL and MEAS f-KL, of which—as explained—each can be used individually or in combination of either two or all three.

The SETPOINT value p-KL-SET is then fed to a pressure controller CONTROLLER-p-KL, which adjusts the cooling pressure variable in dependence on an ACTUAL value of the cooling pressure p-KL measured in the measuring element MEAS p-KL.

For adjusting the cooling pressure p-KL of the cooling pressure variable, the cascaded inner control loop of the secondary actuating device SE2 may for example comprise:

a frequency converter, which controls the speed of a motor of a cooling air fan or a coolant pump; or a control flap in the coolant stream, for example a control flap referred to as a "swirl controller"; or a combination of the two. In the case of a combination, the position of the control flap may be chosen such that the frequency converter can control in an open-loop manner in an optimum working range. Or the output of the frequency converter may be chosen such that the control flap can control in a closed-loop manner in an optimum working range.

As a result of such a control process with a cascaded inner control loop SE2, which is subordinate to an outer control loop SE1, a certain volume and/or mass flow m-KL of the cooling air KL will be established, which in the present case is determinable within a measuring module.

However, in the embodiment described here, the varied flow fluctuations—on account of interventions in the production sections 6 of the section machine 9—are advantageously not used any further in the measured mass and/or volume flow m-KL of the cooling air KL. The filtering effect is shown in method step S4 of FIG. 2. The return of the ACTUAL value Q-KL-ACT is shown in the feedback loop S5 of the method in FIG. 2. This is followed by the outer control loop as part of the primary actuating device SE1 for determining a cooling output variable ΔQ-KL.

Fluctuations of the mass and/or volume flow m-KL are fed to a filter FILTER F(m-KL), which is shown in FIG. 3, and filters and eliminates the fluctuations in the mass and/or volume flow m-KL occurring on account of interventions in the production sections 6, in particular a peak behavior of the same. Corresponding filters are shown by way of example in FIG. 4 and FIG. 5.

Such a filtered value F(m-KL) is then used within a determination unit for an ACTUAL value of a cooling output variable Q-KL-ACT; this in a way corresponding to the formula shown in FIG. 3

$$Q\text{-def} \sim Fi(m\text{-}KL) \cdot T\text{-}KL \cdot f\text{-}KL; \quad i=1, 2,3,4$$

i.e., when using one of the filters Fi (i=1 . . . 4) described below for here the defined cooling output variable Q-def.

Figure 4:
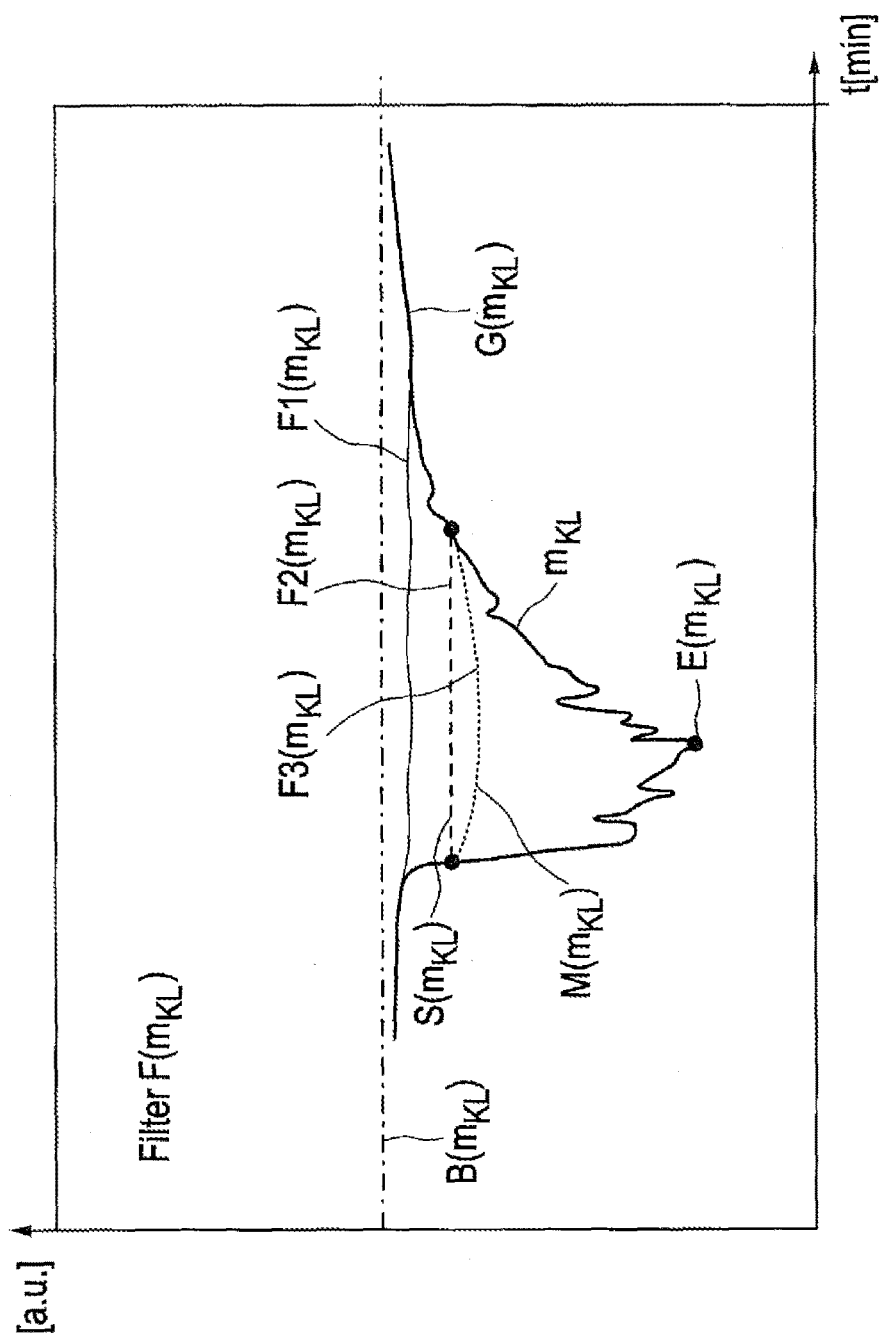
FIG. 4 shows a representation by way of example of the effect of a filter for determining a prescribed cooling output variable in a control scheme of FIG. 3.

FIG. 4 shows in a time-based detail along the time axis t and with any amplitude (a.u.) a variation of a mass or volume flow m-KL, as measured within a measuring module MEAS m-KL shown in FIG. 3, to be specific deviating from a baseline B(m-KL). The measured value of the mass and volume flow m-KL falls relatively steeply—in the form of a peak in a comparatively short time—well below the baseline B(m-KL) to an extreme value E(m-KL) and then rises again up to the baseline B(m-KL).

Such behavior of the mass and volume flow m-KL within the actual measurement is caused for example by a change of the glass molds 7 involving interruption of the cooling air stream of the cooling air KL to one of the production sections 6 of the section machine 9; the interruptions usually occur over a relatively short timescale of several minutes in comparison with regular fluctuations, which latter tend to evolve—to this extent regularly—on a timescale of hours over a daily cycle. This is naturally manifested as a brief drop in the entire mass and volume flow, since the production sections 6 of the section machine 9 are no longer flowed through, i.e., a drop in the shared mass and volume flow m-KL of the cooling air KL is relatively clearly detectable and, according to the finding of a development of the disclosure, not appropriate for being corrected.

Figure 6A:
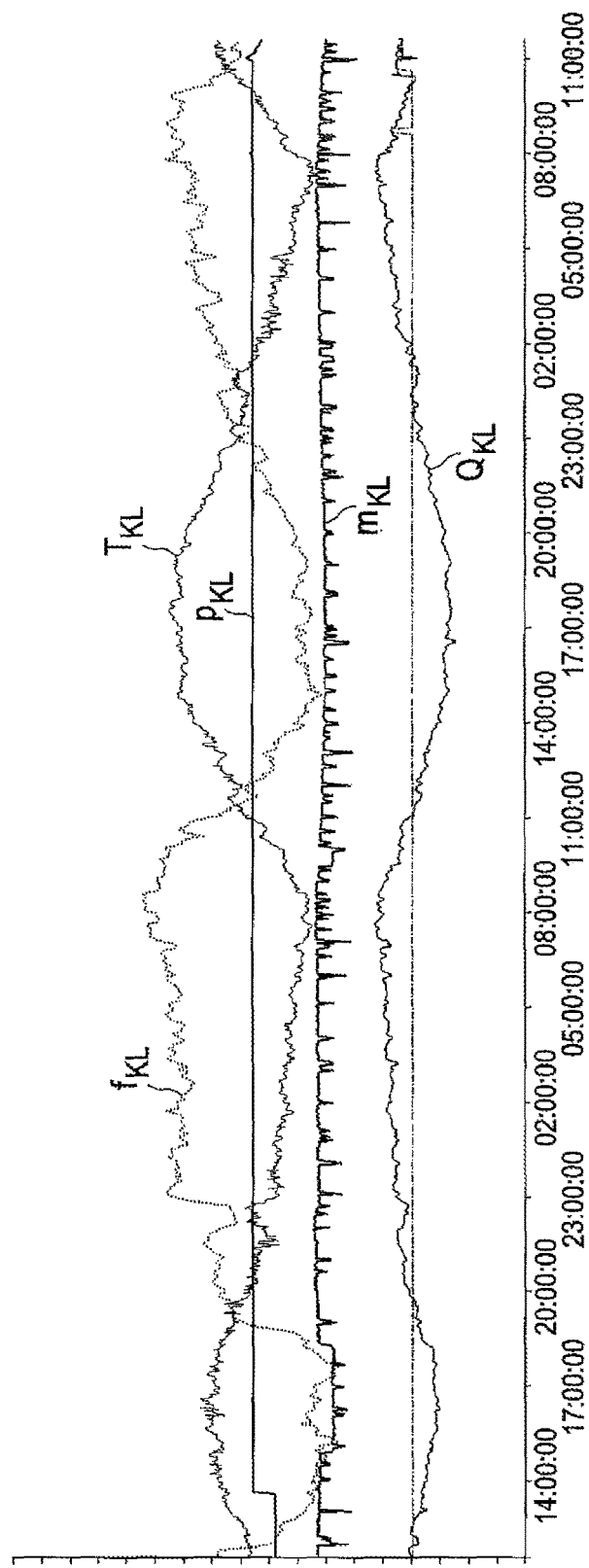
FIGS. 6A and 6B shows a representation of cooling medium parameters and measured variables that can in principle be set in an example that does not belong to the invention, in which a cooling pressure variable is kept constant, in comparison with an example according to the invention, in which the cooling pressure variable is set depending on a prescribed cooling output.
Figure 6B:
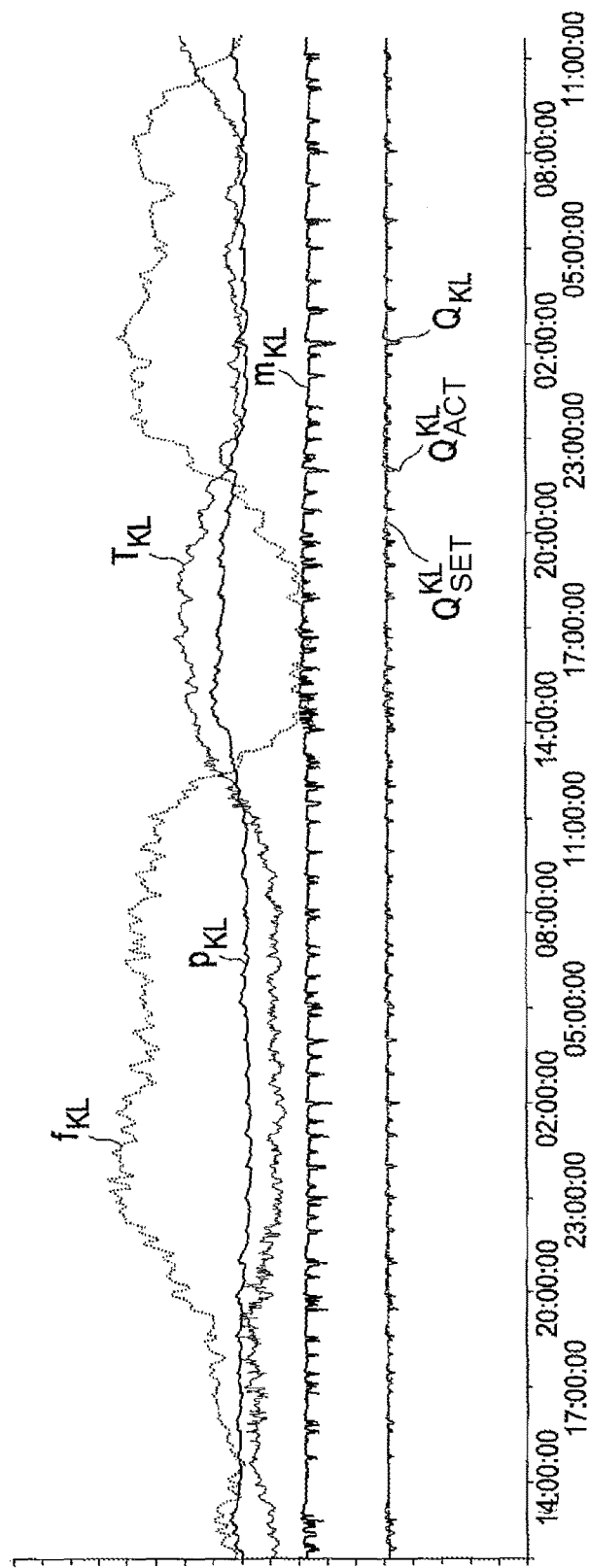

To put it another way, this behavior is especially characteristic of a constant pressure control shown in FIG. 6 view (A) and described above. This tends for example toward maintaining a pressure level; accordingly, when there is an interruption in a ducting of the cooling air at a production section 6 of the section machine 9, for example for a change of glass mold, a mass and volume flow m-KL of the cooling air KL in the production section 6 of the glass mold 7 falls and, when the change of glass mold has been completed, the flow rises again because of the resumed through-flow in the production section 6 of the glass mold 7. To this extent, in principle an underlaid pressure control according to the concept of the disclosure is in any case quite appropriate; however, it should at least follow a correct reference variable in the sense of the concept of the disclosure.

The concept of the disclosure has additionally found that it is indeed not primarily expedient to correct such events as a sudden drop in the cooling air KL by means of the primary cooling output control SE1 with pressure control SE2 underlaid in a cascaded manner. This may just contribute to instabilities in the control dynamics or possibly exacerbate a reverberating oscillation of the controller; approaches to this can be seen in FIG. 6 view (B), since, with the control signal shown there in the background, overall pressure (as the absolute cooling medium parameter) is raised as soon as a drop in a mass or volume flow m-KL is detected. The concept of the disclosure therefore proposes—as shown in FIG. 4—determining the prescribed cooling output variable ΔQ-KL in the corrected form; to be specific by means of a filter F(m-KL), in which here the at least one free cooling medium parameter—here to be specific the mass and/or volume flow m-KL of the cooling air KL—is filtered to eliminate the peak E(m-KL) below the baseline B(m-KL) of the mass and volume flow m-KL.

The effect of a strongly damping frequency filter F1 is shown in FIG. 4 by a solid line; the filtered values of the mass and volume flow m-KL can be seen near the baseline B(m-KL).

Also possible is a filter F2, which provides the replacement of values exceeding a threshold value S(m-KL)—as a dashed line in FIG. 4—by a substitute value; in the present case, the dashed line indicates the threshold value S(m-KL) and the substitute value. That is to say that the filter F2 provides that, when there are deviations from the baseline B(m-KL) beyond a threshold value S(m-KL), precisely the threshold value S(m-KL) should replace the actual measured values of the mass and volume flow m-KL.

A further filter F3 is depicted in FIG. 4 with its effect as a dotted line and corresponds to the effects of a continuous running averaging M(m-KL); with the usual time behavior of a change of glass mold, this leads to a sufficiently strongly damped series of values.

Furthermore, the filters F1, F2, F3 of FIG. 4 also comprise a smoothing function G(m-KL), so that very high-frequency temporal dynamics are smoothed from a mass and volume flow m-KL in the filtered stream of cooling medium F(m-KL); i.e., a mass and volume flow m-KL treated with filter F1, F2, F3 does not use m-KL but the results of a smoothing function G(m-KL) to determine the filtered value F(m-KL)—the smoothed values of the smoothing function G(m-KL) are only shown symbolically in FIG. 4.

Figure 5:
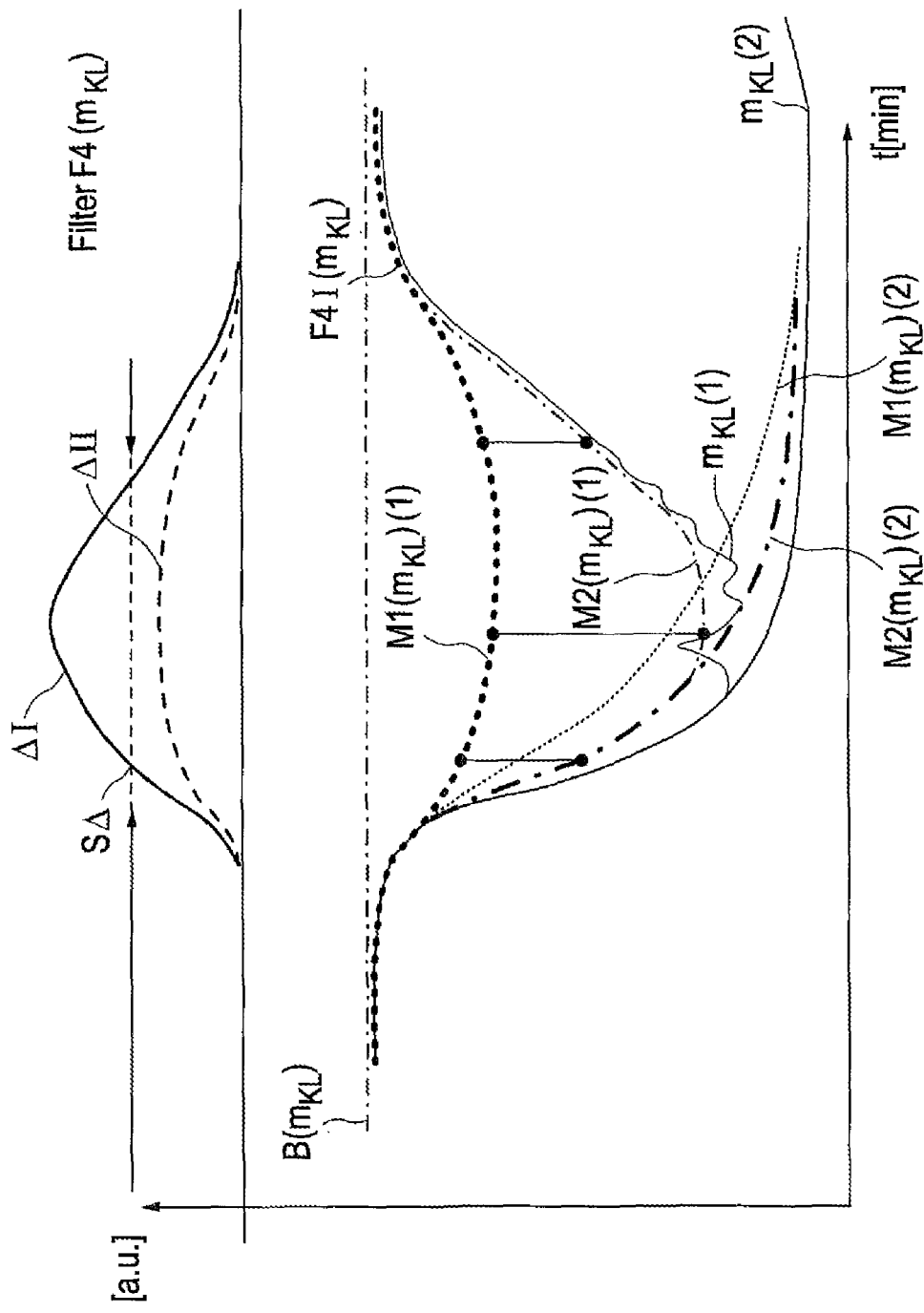
FIG. 5 shows a particularly preferred representation of an effect of the filter in accordance with a first and second running averaging for determining a prescribed cooling output variable in a control scheme of FIG. 3.

FIG. 5 shows a particularly preferred embodiment of a filter FILTER F4(m-KL); to be specific for treating a mass and volume flow m-KL(1) in a first possible time lapse or a further mass and volume flow m-KL(2) in a second possible time lapse. The first variation of a mass and volume flow m-KL(1) corresponds to the state after a variation of the mass and volume flow m-KL, as it is shown in FIG. 4; this approximately depicts a possible result of the variation, as obtained when changing a production section 6 of a section machine 9. The further variation of a mass and volume flow m-KL(2) is intended to correspond to a not externally induced, i.e., normal or regular, variation of a mass and volume flow m-KL.

As shown in FIG. 5, the advantageous filter F4(m-KL) is obtained as a combination of a first running averaging M1(m-KL)—on what tends to be a longer timescale—; the mass and volume flow m KL is consequently comparatively well flattened (dotted line M1(m-KL)(1)) in comparison with the actual real variation m-KL(1).

The second running averaging M2(m-KL)—on what tends to be a shorter timescale—corresponds to a short-time continuous running averaging M2(m-KL); accordingly, as can be seen from FIG. 5, actually only the short-time fluctuations of the mass and volume flow m-KL in the extreme region of the drop in the mass and volume flow m-KL are averaged out (dash-dotted line M2(m-KL)(1)).

In the upper part of FIG. 5, a variation of difference values ΔI(m-KL) is shown as a difference; i.e., as M2(m-KL(1)) minus M1(m-KL(1)) as a solid line.

The filtering effect of the filter F4 is thus obtained because, for further use, not the actual mass and volume flow m-KL but instead that of the running averaging M1(m-KL) on a long timescale is used in the control scheme as soon as the difference value ΔI exceeds a threshold value SΔ. Optionally, instead of the mass and volume flow m-KL(1), that of the second, short-time continuously running average M2(m-KL)(1) may also be used for the control scheme, as long as the difference value ΔII lies below the threshold value SΔ.

For the case outlined here in FIG. 5, this gives a variation of F4(m-KL) as it is shown—by a bold dotted line—in the lower part of FIG. 5 as F4I(m-KL).

For the second case of an actual reduction in the mass and volume flow m-KL(2), while functioning in the same way the filtering effect FILTER F4 is different than in the case described above; to be specific on account of the different variation of the first continuously running averaging M1(m-KL)(2) and second continuously running averaging M2(m-KL(2), one being fundamentally different from the other, on what tends to be a long timescale.

Both continuously running averagings M1(m-KL)(2) and M2(m-KL)(2) are in turn depicted in FIG. 5 and it is immediately evident that the difference between the short-time continuously running averaging M2(m-KL)(2) and the long-time continuously running averaging M1(m-KL)(2) is not particularly great in comparison with the case described above.

This is also manifested in the formation of the difference value for the second variation of the mass and volume flow m-KL(2), which corresponds to an actual decrease in a mass and volume flow. In the upper part of FIG. 5, a variation of difference values ΔII(m-KL) as a difference, i.e., as M2(m-KL(2)) minus M1(m-KL(2)) as a dashed line. The difference value ΔII in the upper part of FIG. 5 follows a much flatter path than the difference value ΔI and no longer approaches the threshold value SΔ.

In this case, it is then decided that either the mass and volume flow m-KL(2) or that of the second short-time continuously running average M2(m-KL(2) is used for the control scheme, since, and as long as, the difference value ΔII lies below the threshold value SΔ. This variation M2(m-KL(2) is shown in the lower part of FIG. 5 as a dash-dotted variation and corresponds quite well to the transient drop in the mass and volume flow m-KL(2).

The advantageously set filter FILTER F4 is consequently capable, both for the case of an actual decrease in a mass and volume flow m-KL(2) and for an externally induced drop in the case of a change of section, of establishing that either an averaging on a short timescale of the mass and volume flow m-KL(2) or optionally the actual mass and volume flow m-KL(2) should be followed in the control scheme of FIG. 3, or else a brief drop in the mass and volume flow m-KL(1) should be averaged by means of an averaging on a long timescale.

Figure 7:
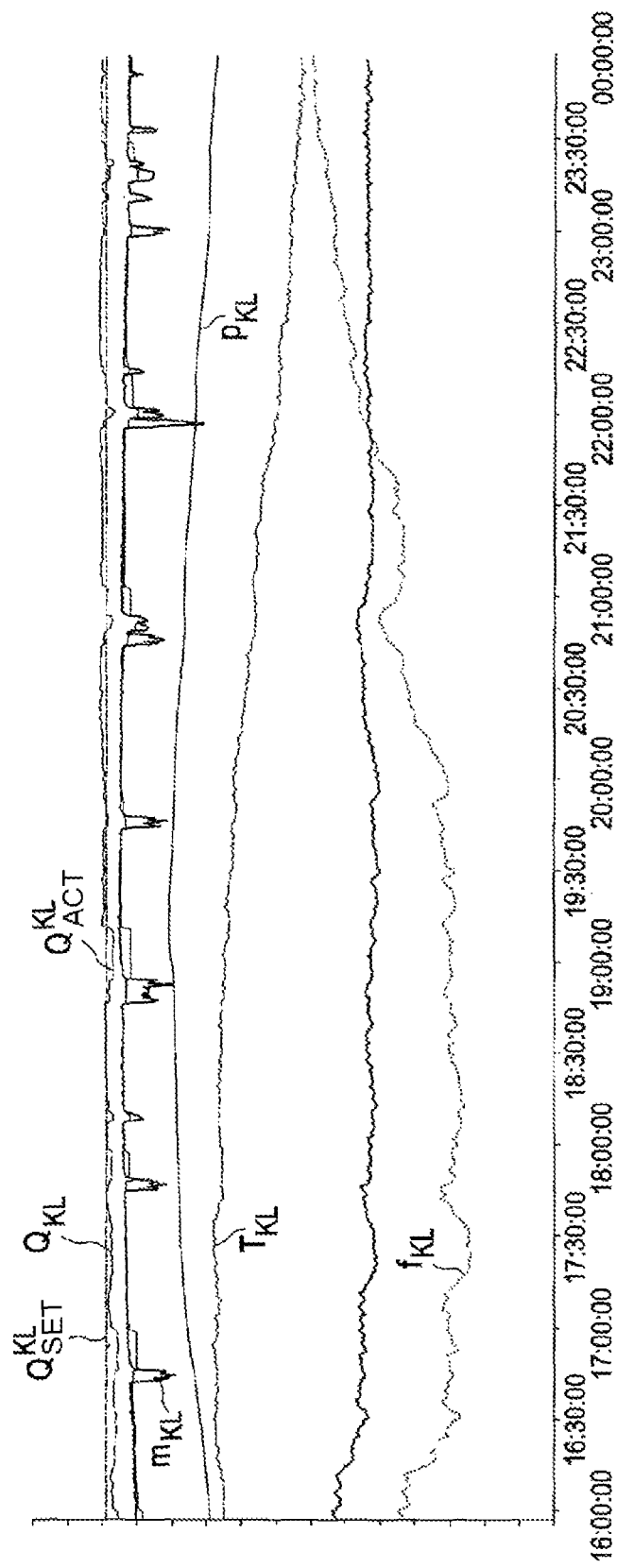
FIG. 7 shows a representation by way of example of the effect according to the disclosure, in which the prescribed cooling output variable is determined by means of a filter.

The positive effects of such an approach of a mass and volume flow m-KL treated with filter F1, F2, F3, F4 can be clearly seen in the much steadier or smoother variation of the cooling pressure p-KL in FIG. 7 in comparison with FIG. 6 view (B).

FIG. 6 shows by comparison of the view (B) and the view (A) the positive effects of a pressure control SE2 underlaid in a cascaded manner under the output control SE1 described above; to be specific according to the concept of the disclosure in comparison with a constant pressure control in view (A) that does not belong to the disclosure.

For this purpose, both views (A) and (B) of FIG. 6 show over 24 hours between 0:00 h and 24:00 h of a day by way of example the variations over time indicated in the views of the following cooling medium parameters of the cooling air KL in the case of a section machine 9 described above: the variation of the pressure p-KL of the cooling air—in view A prescribed as a constant pressure, in view B adjusted as an underlaid cascaded control loop—, the variation of the cooling output Q-KL of the cooling air KL—in view (A) fluctuating on account of air humidity and temperature fluctuations, in view (B) prescribed as a constant output value (SETPOINT value) by way of example—, the variation of the volume and mass flow m-KL of the cooling air KL, the variation of the temperature T-KL of the cooling air KL and the variation of the air humidity f-KL as relative air humidity of the cooling air KL.

In view (A), it can be seen that at high temperature values T-KL of the cooling air KL—for example in the afternoon between 15:00 h and 18:00 h—the cooling output Q-KL of the cooling air falls drastically below a cooling output actually desired to be constant; this is because in the same time period the air humidity f-KL decreases and intensifies the effect. In the converse case—in the time period between midnight 24:00 h and 6:00 h in the morning—a comparatively low temperature T-KL of the cooling air, and consequently high cooling capacity with also a high air humidity f-KL of the cooling air, the cooling air KL is ducted with a comparatively excessive cooling output Q-KL. This behavior is plausible for a constant pressure control for a pressure p-KL of the cooling air that has been proposed many times in the prior art. Although such a constant pressure control may be helpful and possibly prevent a disturbing transfer of reductions in an amount of cooling air in the case of one production section to other production sections of a section machine when there is a change of the glass mold or a change of section, it is not conducive to the quality of the glass bodies 1 produced, since—as can be seen—only an arbitrary, but in any case not deterministic, variation can be expected for the cooling output Q-KL, since over 24 hours the cooling output Q-KL tends rather to follow the external conditions.

The irregularity in view (A) of the cooling output Q-KL plotted in FIG. 6 is obtained whenever the cooling output Q-KL is intended to be adjusted in dependence on a glass mold temperature T-F. The problem is therefore in a pressure control when an alteration of air humidity and temperature fluctuations of the cooling air are not compensated.

For this purpose, according to the concept of the disclosure, the cascaded underlaid—inner—pressure control SE2 described above after upstream—outer—output control SE1 is proposed. The output control and the effect of the same are illustrated in view (B) of FIG. 6 by a constant output control given merely by way of example; the positive effects that can be seen in view (B) of FIG. 6 are obtained whenever the cooling output Q-KL is controlled in dependence on a mold temperature T-F, as explained generally on the basis of FIG. 3 and FIG. 2.

Accordingly, FIG. 6 shows in view (B) for the variation over time of the cooling output Q-KL a SETPOINT value and an ACTUAL value of the output Q-KL-SET, Q-KL-ACT in the case of a constant control. The pressure values p-KL in this case seek to compensate for the humidity and temperature fluctuations f-KL, T-KL—as can be seen from view (B) of FIG. 6—by an underlaid, inner cascaded control loop for the pressure variation p-KL. This takes place by the pressure being increased when there is a rising temperature and falling air humidity and the pressure being decreased when there is a falling temperature and rising air humidity. Accordingly, a coupling of the measuring elements MEAS for T-KL and f-KL for the setting of the pressure values p-KL in SET-p-KL is provided on the basis of FIG. 3 in addition or as an alternative to $Q_{def}$.

However, it is in that case to be expected that—as described—the drops that can be seen in the mass and volume flow m-KL are transferred in a downward direction to other production sections 6 of the section machine 9; i.e., an adjusted pressure variation p-KL possibly seeks to compensate for these perceptibly by pressure deflections in an upward direction for controlling the cooling air KL jointly for all of the production sections 6.

As a result, a filter FILTER F(m-KL)—as explained on the basis of FIG. 4 and FIG. 5—is therefore proposed; the effect of such a filter can be seen in FIG. 7 on a shorter timescale of a variation of p-KL, m-KL, T-KL, f-KL and Q-KL. The pressure variation p-KL no longer has the re-adjusting artefacts of FIG. 6 view (B). The positive effect of a filter is also clear in the much steadier variation of the cooling pressure p-KL in FIG. 7 in comparison with FIG. 6 view (B). The SETPOINT value and ACTUAL value of the output control Q-KL (i.e., Q-KL-ACT and Q-KL-SET) are virtually congruent.

It can consequently be seen from the advantages presented in FIG. 7 that, with an output adjustment (for example in dependence on a mold temperature T-F), correct conduction of the cooling output is possible even when there is frequent changing of the mold (as can be seen from the mass and volume flow m-KL in FIG. 7), which nevertheless filters away disturbances in the stream of cooling air. As a result, moreover, temperature and humidity fluctuations are compensated by varying pressure setpoint values, but the disturbances of the cooling air flow are reduced; i.e., for example damped, smoothed or ignored.

In a dataset of measured variables and settable cooling medium parameters, various cooling output categories may be prescribed as a cooling output variable. Thus, as a result, a master system interface may by way of example provide an automatic control on the basis of the concept described above for a medium pressure level with moderate cooling output. A manual control may also be provided for a medium to high air pressure level with moderate and increased cooling output Q-KL. Since the corresponding values of an air humidity and air temperature may be very different—depending on the climatic conditions wherever in the world a section machine is sited; for example at a site in India (with regularly higher levels of air humidity and air temperatures) or at a site in Germany (with regularly moderate but greatly fluctuating levels of air humidity and air temperatures)—, these can be compensated by a corresponding pressure adaptation, to be specific by means of a higher SETPOINT value of the cooling air pressure p-KL.

As part of a further embodiment not shown here, instead of a filter FILTER F(m-KL) of FIG. 3 for the mass and/or volume flow, there is the possibility of allowing this mass and/or volume flow (flow rate of the coolant) especially to be disregarded completely. An open-loop control and/or closed-loop control that works with a coolant stream, i.e., the variation of the volume and/or mass flow m-KL of the cooling KL, to be calculated internally on the basis of a model as a function of the coolant pressure p-KL of the cooling air may be provided for this. This corresponds virtually to the assumption of a fixed flow resistance in the section machine. The filtering FILTER F(m-KL) especially of this mass and/or volume flow (flow rate of the coolant) and also its measurement MEAS m-KL could therefore be omitted whenever the variation of the volume and/or mass flow m-KL of the cooling air KL is modeled as a function of the coolant pressure p-KL of the cooling air. To this extent, the concept also comprises a model filter FILTER, which provides a modeling of the mass and/or volume flow (flow rate of the coolant).

The invention claimed is:
1. A method for controlling a process of cooling a plurality of glass molds with a cooling medium in a process of producing glass bodies or hollow glass bodies, in a section machine with a further plurality of production sections, wherein a production section of the section machine is respectively assigned at least one of the glass molds, and
  for cooling the plurality of glass molds, the cooling medium is supplied on a jointly shared basis, wherein the supplying of the shared cooling medium for the plurality of glass molds is jointly controlled and the shared cooling medium is assigned a plurality of absolute cooling medium parameters and the absolute cooling medium parameters are determined as cooling medium parameters that are shared by the plurality of glass molds,
  wherein the cooling medium is assigned as absolute cooling medium parameters that can be set jointly for the plurality of glass molds at least one cooling capability and a cooling pressure, which are set, wherein:
    on the basis of a desired cooling capability of the cooling medium, a cooling capability variable is determined by a primary actuating device, and the cooling capability variable is prescribed to a secondary actuating device,
    depending on the prescribed cooling capability variable, a cooling pressure variable is prescribed by the secondary actuating device on the basis of the cooling pressure of the cooling medium in such a way that a cooling capability of the cooling medium is made to approximate to the desired cooling capability of the cooling medium,
    a variable describing the cooling capability is a defined cooling output taking into account a mass and/or volume flow of the cooling medium, a temperature of the cooling medium and a humidity of the cooling medium, and/or
    a variable describing the cooling capability is a temperature of the cooling medium and/or a humidity of the cooling medium, taking into account a mass and/or volume flow of the cooling medium.

2. The method as claimed in claim 1 wherein the cooling capability is a variable describing a cooling output and/or a cooling capacity.

3. The method as claimed in claim 2 wherein a variable describing the cooling capacity is a composition of the cooling medium that includes a vapor fraction.

4. The method as claimed in claim 1 wherein a cooling gas, a cooling air, a cooling vapor or cooling water or some other fluid is used as the cooling medium and/or the section machine is an individual section machine (IS machine) or a rotary section machine (rotary blowing machine).

5. The method as claimed in claim 1 wherein the primary actuating device comprises an open-loop and/or closed-loop control device by which the cooling capability is controlled in a closed-loop and/or open-loop manner in dependence on a glass mold temperature.

6. The method as claimed in claim 5 wherein, as part of a pre-control with downstream closed-loop control of the cooling capability, wherein the cooling capability is controlled constantly with a value that can be variably prescribed but is fixed.

7. The method as claimed in claim 1 wherein the cooling medium is assigned absolute free cooling medium parameters that can be determined jointly for the plurality of glass molds, which are determined and preprocessed by a filter for filtering at least one of the free cooling medium parameters.

8. The method as claimed in claim 7 wherein the primary actuating device comprises: an acquisition and a filter, for the at least one free cooling medium parameter; wherein the primary actuating device has a measured value acquisition for at least one or more of the cooling medium parameters selected from the group: cooling medium temperature, cooling medium humidity, mass and volume flow of the cooling medium.

9. The method as claimed in claim 1 wherein the secondary actuating device comprises an open-loop and/or closed-loop control device by which the cooling pressure variable is controlled in a closed-loop and/or open-loop manner in dependence on the prescribed cooling capability.

10. The method as claimed in claim 1 wherein the cooling pressure variable is controlled in a closed-loop and/or open-loop manner in dependence on the prescribed cooling capability as part of a pre-control with downstream closed-loop control of the cooling pressure variable; wherein the secondary actuating device comprises a measured value acquisition for at least the cooling pressure variable.

11. The method as claimed in claim 1 wherein
the primary actuating device for the cooling capability and the secondary actuating device for the cooling pressure are cascaded, wherein the primary actuating device comprises an outer open-loop control and/or an outer control loop, which is subordinate to the secondary actuating device as an inner open-loop control and/or an inner control loop, and/or
the primary actuating device and the secondary actuating device are coupled by way of the measured value acquisition for at least one cooling medium parameter.

12. The method as claimed in claim 1 wherein:
on the basis of the desired cooling capability as a SETPOINT value of the cooling medium, a cooling capability variable is determined as an ACTUAL value by the primary actuating device in the form of an outer control loop and the cooling capability variable is prescribed as a reference variable to a secondary actuating device in the form of an inner control loop, and, depending on the prescribed cooling capability variable as the reference variable, a cooling pressure variable is prescribed as a SETPOINT value by the secondary actuating device on the basis of the cooling pressure as the ACTUAL value of the cooling medium in such a way that a cooling capability variable as an ACTUAL value of the cooling medium is made to approximate to the desired cooling capability variable as a SETPOINT value of the cooling medium.

13. The method as claimed in claim 1 wherein:
a desired capability, specifically the cooling output, is prescribed as a SETPOINT value to a primary actuating device and an ACTUAL value is determined as a cooling capability variable and a deviation of the SETPOINT value and ACTUAL value is used as a prescribed cooling capability variable to be specific as a reference variable, and
depending on the prescribed cooling capability variable as a reference variable, a cooling pressure variable is set by the secondary actuating device in such a way that the deviation is reduced.

14. The method as claimed in claim 1 wherein:
a cooling medium to which the plurality of absolute cooling medium parameters are assigned is supplied and the absolute cooling medium parameters for the plurality of glass molds are determined jointly before the cooling medium is divided among the production sections and/or
for cooling the plurality of glass molds the cooling medium is supplied to them, and the jointly settable absolute cooling medium parameters are jointly controlled for a further plurality of production sections of the section machine and/or without the jointly settable cooling medium parameters of the cooling medium being controlled individually for one or more production sections of the further plurality.

15. The method as claimed in claim 1 wherein the pressure variable comprises one or more of the variables that are selected from the group consisting of: the pressure of the cooling medium, the flow pressure of a cooling medium stream of the cooling medium, the flow pressure of a cooling medium stream of the cooling medium that is supplied to a further plurality of production sections of the section machine on a jointly shared basis, wherein a pressure of the cooling medium, flow pressure of a cooling medium stream of the cooling medium, is at least one of determined and measured.

16. The method as claimed in claim 1 wherein an irregularity of a cooling medium parameter and/or of a cooling capability variable or of one of the variables influencing the latter is determined, further comprising determining whether the irregularity is occurring as a result of an external intervention at one of the production sections of the section machine or for some other reason, and the filter is designed at least to reduce the irregularity in the cooling medium parameter and/or the cooling capability variable.

17. The method as claimed in claim 16 wherein the first and/or second value filter and/or a filter for some other measured value comprises one or more filter units selected from the group consisting of: smoothing, a time-based high-frequency filter, running averaging, first running averaging on a first timescale and second running averaging on a second timescale, replacing values exceeding a threshold value with a substitute value, wherein the substitute value being a threshold value or a running average, replacing excessive values and/or extreme values.

18. The method as claimed in claim 1 wherein a determined value of a mass and/or volume flow of the cooling medium is initially fed to a first value filter and only the filtered value is used for determining a cooling capability that is a defined and absolute cooling output.

19. The method as claimed in claim 18 wherein
the first value filter is activated for the case where an intervention in a production section that influences a value of a mass and/or volume flow of the cooling medium is signaled and/or detected, and/or
the second value filter is activated for the case where an intervention in a production section that influences a value for determining an absolute defined cooling output or cooling capacity of the cooling medium is signaled and/or detected.

20. The method as claimed in claim 1 wherein a temperature of the cooling medium and/or a cooling medium humidity is initially fed to a second value filter and only the filtered value is used for determining a defined and absolute cooling output.

21. The method as claimed in claim 1 wherein a model filter provides a modeling of the mass and/or volume flow, wherein the variation of the volume and/or mass flow of the cooling air is modeled as a function of the coolant pressure of the cooling air.

22. A production method for glass bodies, or for hollow glass bodies, in a section machine with a further plurality of production sections, wherein a production section of the production sections of the section machine is respectively assigned at least one glass mold of a plurality of glass molds, and a cooling of the plurality of glass molds with a cooling medium is controlled, and
for cooling the plurality of glass molds, the cooling medium is supplied on a jointly shared basis, wherein the supplying of the shared cooling medium for the plurality of glass molds is jointly controlled and the shared cooling medium is assigned a plurality of absolute cooling medium parameters and the absolute cooling medium parameters are determined as cooling medium parameters that are shared by the plurality of glass molds,
wherein the cooling medium is assigned as absolute cooling medium parameters that can be set jointly for the plurality of glass molds at least one cooling capability and a cooling pressure, which are set and subjected to closed-loop and/or open-loop control, wherein:
on the basis of a desired cooling capability of the cooling medium, a cooling capability variable is determined by a primary actuating device, and the cooling capability variable is prescribed to a secondary actuating device,
depending on the prescribed cooling capability variable, a cooling pressure variable is prescribed by the secondary actuating device on the basis of the cooling pressure of the cooling medium in such a way that a cooling capability of the cooling medium is made to approximate to the desired cooling capability of the cooling medium,
a variable describing the cooling capability is a defined cooling output taking into account a mass and/or volume flow of the cooling medium, a temperature of the cooling medium and a humidity of the cooling medium, and/or
a variable describing the cooling capability is a temperature of the cooling medium and/or a humidity of the cooling medium, taking into account a mass and/or volume flow of the cooling medium.

23. The production method as claimed in claim 22 wherein a cooling gas, a cooling air, a cooling vapor or cooling water or some other fluid is used as the cooling medium and/or the section machine is an individual section machine (IS machine) or a rotary section machine (rotary blowing machine).

24. A production apparatus for glass bodies or for hollow glass bodies, with a section machine with a further plurality of production sections, wherein a production section of the production sections of the section machine is respectively assigned at least one glass mold of a plurality of glass molds, and
for cooling the plurality of glass molds with a cooling medium in a process of producing glass bodies, a cooling medium shared by the plurality of glass molds is supplied to the glass molds, wherein the supplying of the shared cooling medium for the plurality of glass molds is jointly controlled and the shared cooling medium is assigned a plurality of absolute cooling medium parameters and the absolute cooling medium parameters are determined as cooling medium parameters that are shared by the plurality of glass molds by an open-loop and/or closed-loop control device as claimed in claim 22 wherein, for controlling a process of cooling the plurality of glass molds in the production of glass bodies,
wherein the cooling medium is assigned as absolute cooling medium parameters that can be set jointly for the plurality of glass molds at least one cooling capability and a cooling pressure, which can be set and are subjected to closed-loop and/or open-loop control, wherein:
on the basis of a desired cooling capability of the cooling medium, a cooling capability variable can be determined by a primary actuating device, and the cooling capability variable can be prescribed to a secondary actuating device,
depending on the prescribed cooling capability variable, a cooling pressure variable can be prescribed by the secondary actuating device on the basis of the cooling pressure of the cooling medium in such a way that a cooling capability of the cooling medium is made to approximate to the desired cooling capability, specifically a cooling output, of the cooling medium,
a variable describing the cooling capability is a defined cooling output taking into account a mass and/or volume flow of the cooling medium, a temperature of the cooling medium and a humidity of the cooling medium and/or
a variable describing the cooling capability is a temperature of the cooling medium and/or a humidity of the cooling medium, taking into account a mass and/or volume flow of the cooling medium.

25. The production apparatus as claimed in claim 24 wherein a cooling gas is used as the cooling medium and/or the section machine is an individual section machine (IS machine) or a rotary section machine (rotary blowing machine).

26. An open-loop and/or closed-loop control device for controlling a process of cooling a plurality of glass molds with a cooling medium in a process of producing glass bodies in a section machine with a further plurality of production sections, wherein a production section of the section machine is respectively assigned at least one of the glass molds, and
for cooling the plurality of glass molds, the cooling medium is supplied on a jointly shared basis, wherein the supplying of the shared cooling medium for the plurality of glass molds is jointly controlled and the shared cooling medium is assigned a plurality of absolute cooling medium parameters and the absolute cooling medium parameters are determined as cooling medium parameters that are shared by the plurality of glass molds, wherein the cooling medium is assigned as absolute cooling medium parameters that can be set jointly for the plurality of glass molds at least one cooling capability and a cooling pressure, which can be set and subjected to closed-loop and/or open-loop control, wherein on the basis of a desired cooling capability of the cooling medium, a cooling capability variable is determined by a primary actuating device, and the cooling capability variable can be prescribed to a secondary actuating device, depending on the prescribed cooling capability variable, a cooling pressure variable can be prescribed by the secondary actuating device on the basis of the cooling pressure of the cooling medium in such a way that a cooling capability of the cooling medium is made to approximate to the desired cooling capability of the cooling medium, a variable describing the cooling capability is a defined cooling output taking into account a mass and/or volume flow of the cooling medium, a temperature of the cooling medium and a humidity of the cooling medium, and/or a variable describing the cooling capability is a temperature of the cooling medium and/or a humidity of the cooling medium, taking into account a mass and/or volume flow of the cooling medium.

* * * * *